(12) United States Patent
Jukes et al.

(10) Patent No.: US 12,259,047 B2
(45) Date of Patent: Mar. 25, 2025

(54) THREE-WAY-VALVE

(71) Applicant: BELIMO HOLDING AG, Hinwil (CH)

(72) Inventors: Andrew James Jukes, Adetswil (CH); Urs Keller, Hinwil (CH)

(73) Assignee: BELIMO HOLDING AG, Hinwil (CH)

(*) Notice: Subject to any disclaimer, the term of this patent is extended or adjusted under 35 U.S.C. 154(b) by 3 days.

(21) Appl. No.: 18/036,685

(22) PCT Filed: Dec. 2, 2021

(86) PCT No.: PCT/EP2021/083963
§ 371 (c)(1),
(2) Date: May 12, 2023

(87) PCT Pub. No.: WO2022/122544
PCT Pub. Date: Jun. 16, 2022

(65) Prior Publication Data
US 2024/0019036 A1    Jan. 18, 2024

(30) Foreign Application Priority Data
Dec. 11, 2020   (CH) ..................................... 01569/20

(51) Int. Cl.
*F16K 11/087*    (2006.01)
(52) U.S. Cl.
CPC ................. *F16K 11/0873* (2013.01)
(58) Field of Classification Search
None
See application file for complete search history.

(56) References Cited

U.S. PATENT DOCUMENTS 3,118,650 A * 1/1964 Cooper ............... F16K 11/0873
251/315.13
5,927,687 A * 7/1999 Krause ................. F16K 5/0689
251/315.08

(Continued)

FOREIGN PATENT DOCUMENTS

| CN | 105422918 A | 3/2016 |
|---|---|---|
| KR | 20-2009-0007705 U | 7/2009 |
| KR | 10-2178859 B1 | 11/2020 |

OTHER PUBLICATIONS

Swiss Search Report for CH 15692020 dated Mar. 17, 2021.

(Continued)

*Primary Examiner* — Matthew W Jellett
(74) *Attorney, Agent, or Firm* — Sughrue Mion, PLLC (57) ABSTRACT

Disclosed is a three-way valve (1) with an A-port (1A), a B-port (1B), and an AB-port (1AB), a valve body (11) and a regulation body (12). The three-way valve (1) further includes an A-sided valve seat (3A), an AB-sided valve seat (3AB) and an auxiliary valve seat (3'), wherein the A-sided valve seat (3A), the AB-sided valve seat (3AB) and the auxiliary valve seat (3') are each arranged inside the valve body (11) and contact the regulation body (12) in a sealing manner. The A-sided valve seat (3A) is arranged at the A-port (1A), the AB-sided valve seat (3AB) is arranged at the AB-port, and the auxiliary valve seat (3') is arranged opposite to the B-port (1B), with the regulation body (12) between the B-port (1B) and the auxiliary valve seat (3').

11 Claims, 6 Drawing Sheets

(56) References Cited

U.S. PATENT DOCUMENTS

| | | | |
|---|---|---|---|
| 9,677,717 B2* | 6/2017 | Jenks | F16K 11/0873 |
| 11,047,491 B2* | 6/2021 | Jenks | F16K 11/0873 |
| 2019/0078692 A1 | 3/2019 | Bonomi et al. | |

OTHER PUBLICATIONS

International Search Report for PCT/EP2021/083963 dated Mar. 28, 2022.
Written Opinion for PCT/EP2021/083963 dated Mar. 28, 2022.

* cited by examiner

THREE-WAY-VALVE

CROSS REFERENCE TO RELATED APPLICATIONS

This application is a National Stage of International Application No. PCT/EP2021/083963 filed Dec. 2, 2021, claiming priority based on Swiss Patent Application No. 01569/20 filed Dec. 11, 2020, the contents of each of which being herein incorporated by reference in their entireties.

FIELD OF THE INVENTION

The present disclosure relates to three-way valves, in particular three-way ball valves as well as to the assembly and application of such valves.

SUMMARY OF THE INVENTION

Three-way valves that are designed as ball valves are widely known in the art for controlling the flow of a fluid (liquid, gas, or mixture of both). In dependence of the valve position, one of its port (in the following referred to as AB-port) may be either fluidically coupled with either of the two other ports (in the following referred to as A-port and B-port), or both of them. While a variety of designs is known for such valves, a general problem of many designs is that in the valve position where the A-port (which is arranged in line with the AB-port) is fluidically coupled with the AB-port while the B-port (which is arranged between and traverse to the A-port and the AB-port) a large fluidic pressure at the blocked B-port may result in leakage from the B-port to the A-port or the AB-port.

A further problem of known three-way valves which are designed as ball valves is that the regulation body (the ball) may be blocked in an intermediate position and accordingly block the valve due to undesired and irreversible movement of a valve seat (washout) as discussed further below.

It is an overall objective of the present disclosure to improve the state of the art regarding the design of three-way ball valves. Favorably, one all of the before-mentioned drawbacks of designs that are known from the prior art are avoided or at least reduced.

In an aspect the overall objective is achieved by providing a three-way valve, in particular a ball valve. In a further aspect, the overall objective is achieved by HVAC system, the HVAC system including at least one three-way valve in accordance with the present disclosure. In a still further aspect, the overall objective is achieved by the use of a three-way-valve in accordance with the present disclosure for controlling a flow of a heat-transport fluid in an HVAC-system. The three-way valve may be designed for controlling a flow of generally any fluid, i. e. liquid, gas, or a 1o mixture thereof. In particular in the context of an HVAC system, the fluid may in particular be water or a water/glycol mixture as typical heat transport fluids.

The three-way valve includes an A-port, a B-port, and an AB-port. The three-way further includes a valve body and a regulation body. The regulation body is arranged within the valve body rotatable around a rotation axis. An outer surface of the regulation body is delimited by a sphere and a fluidic lumen extends through the valve body. With other words, the regulation body is generally shaped as a perforated ball. In one of the rotational end position of the regulation body (A-position), a fluidic passage exists between the A-port and the AB-port, while the B-port is fluidically blocked. In the opposite rotational end position of the regulation body (B-position), a fluidic passage exists between the B-port and the AB-port, while the A-port is fluidically blocked. In intermediate positions, all of the A-port, the B-port and the AB-port are fluidically connected, with the effective cross sectional areas that are flown through depending on the rotational position of the regulation body. The rotational angle between the A-position and the B-Position is generally 90 degrees. The A-port and the AB-port are typically arranged at opposite sides of the valve body and along a straight line. The B-port is generally arranged between and traverse, for example perpendicular, to the A-port and the AB-port.

The three-way valve is a fluidic valve and may be designed for a liquid, a gas or a mixture thereof. The fluid may in particular be a heat transport fluid, for example water or a water/glycol mixture.

The valve body and the regulation body are typically made from metal, for example, brass and/or stainless steel, and/or from plastics. By way of example, the valve body may be made from brass and the regulation body may be made from steel or chrome-plated brass. In any case, the valve seats may for example be made from PTFE.

The three-way-valve may in principle be designed for any desired pressure and flow in accordance with the specific application requirements. In an HVAC context, typical maximum pressures are, for example 16 bar or 40 bar and two typical maximum flows may be 60 m³/h or 4 m³/h. Typical maximum fluid temperatures may for example be 120° Celsius or 150° Celsius.

In accordance with the present disclosure, the three way-valve further includes an A-sided valve seat, an AB-sided valve seat and an auxiliary valve seat. The A-sided valve seat, the AB-sided valve seat and the auxiliary valve seat are each arranged inside the valve body and contact the regulation body in a sealing manner. The A-sided valve seat is arranged at the A-port, and the AB-sided valve seat is arranged at the AB-port. The auxiliary valve seat is arranged opposite to the B-port, with the regulation body between the B-port and the auxiliary valve seat.

The A-sided valve seat and the AB-sided valve seat are in each case generally ring-shaped with a central fluidic passage that are, in operation, flown through by the fluid entering respectively exiting the three-way valve at the A-port and the B-port, respectively. The auxiliary valve seat is a blind valve seat that is not flown through by the fluid but serves the sole purpose of supporting the regulation body. The central fluidic passage has a generally rotational symmetrical, in particular circular, cross section. The auxiliary valve seat may optionally have a central fluidic passage which, however, is not flown through, or may not have such fluidic passage.

The arrangement of the valve seats in accordance with the present disclosure provides particularly favorable characteristics. In the A-position where the B-port is fluidically blocked, the pressure of a fluid at the B-port forces the regulation body against the auxiliary valve seat, resulting in a tight fluidic sealing of the B-port. In this way, even a large fluidic pressure at the B-port which may exceed the fluidic pressure at the A-port will not result in a leakage from the B-port to the A-port or the AB-port.

In accordance with the present disclosure, no B-sided valve seat is arranged at the B-port in the manner as explained before for the A-sided valve seat and the B-sided valve seat. Typically, the three-way-valve comprises exactly three ports, namely the A-port, the B-port and the AB-port, and three valve seats, namely the A-sided valve seat, the AB-sided valve seat and the auxiliary valve seat as mentioned before. In contrast to known arrangement with four valve seats which are arranged around the regulation body, a design with three valve seats in accordance with the present disclosure as explained above has the further advantage of a lower torque for moving respectively rotating the regulation body.

Further, a valve seat arrangement in accordance with the present disclosure may favorably prevent a blocking of the regulation body which is a critical issue if the regulation body is in an intermediate position for the following reason: The valve seats are generally made from a comparably soft material, e. g. PTFE, that further tends to soften with increasing temperature. In an intermediate position of the regulation body (i. e. a position between the A-position and the B-position, and in particular around the 45-degree position), a void exists between the valve seats and the regulation body. Under the influence of the fluidic pressure, valve seats tend to be deform and a valve seat, in particular the A-sided valve seat or the AB-sided valve seat may, for prior art valve designs, be partially displaced into such void under adverse conditions, thereby blocking the regulation. For a design in accordance with the present disclosure, the valve seats mutually support each other, thereby preventing a blocking as mentioned before (in this context also see FIG. 6a, FIG. 6b as discussed further below).

In an embodiment, the A-sided valve seat, the AB-sided valve seat and the auxiliary valve seat include in each case a regulation body contact surface and a support surface, wherein the regulation body contact surface and the support surface are inclined with respect to each other. The regulation body contact surface of a valve seat is in each case a circumferential surface that contacts the regulation body in a circumferential manner in an assembled state. The regulation body contact surface and the support surface being inclined to each other refers to a cross sectional view, with the sectional plane extending through the regulation body contact surface, the support surface and the center of the respective valve seat. In a particular embodiment, the circular regulation body contact surface and the support surface form a right angle or approximately a right angle in the cross sectional view. Further in particular embodiment, one, two or all of the valve seats are rotationally symmetric with respect to a longitudinal valve seat axis of the respective valve seat. Such rotationally symmetric valve seats are particularly favorable regarding manufacture. In such embodiment, the support surface is a circumferential support surface. Further in a particular, embodiment, the regulation body contact surface and the support surface form straight lines in the cross sectional view. In alternative designs, the regulation body contact surface and the support surface may be curved in the cross-sectional view.

In a particular embodiment, the support surface of the A-sided valve seat and the support surface of the AB-sided valve seat in each case abut the support surface of the auxiliary valve seat.

The regulation body contact surface and the support surface of a valve seat may, in combination form a protrusion or nose, for example a circumferential protrusion or nose that projects from a main body of the valve seat in axial direction and faces the regulation body in a mounted configuration. In particular, for the A-sided valve seat and the AB-sided valve seat, such protrusion may generally be arranged around the central fluidic passage of the respective valve seat in a rotational symmetric manner. The regulation body contact surface and the support surface are oblique to a longitudinal valve seat axis, with the regulation body contact surface being arranged closer to the longitudinal valve seat axis than the support surface. The regulation body contact surface and the support surface may be arranged adjacent to teach other or be separated by a chamfer surface, in particular a circumferential chamfer surface. Such chamfer surface may be perpendicular to the longitudinal valve seat axis.

A design of the valve seats with a regulation body contact surface and a support surface as explained before is found to be particularly favorable regarding the leakage prevention as well as well as regarding the assembly.

In an embodiment, the A-sided valve seat, the AB-sided valve seat and the auxiliary valve seat are in each case elastically biased against the regulation body. For the elastic biasing, dedicated spring elements respectively biasing elements may be present and/or by the compression of sealing elastic elements, such as elastic O-rings as discussed further below.

In an embodiment, the A-sided valve seat, and/or the AB-sided valve seat and/or the auxiliary valve seat is/are structurally distinct components. They may in particular be distinct from the valve body. In a particular embodiment, the A-sided valve seat, the B-sided the valve seat and the auxiliary valve seat are in each case structurally distinct components. In a particular embodiment, the A-sided valve seat, the AB-sided valve seat, and the auxiliary valve seat are in each case fixed inside the valve body by way of force fit.

A fixation byway of force fit is particularly favourable in combination with valve seats that each have a regulation body contact surface and a support surface as explained before, since for such embodiment the valve seats stabilize each other via their support surfaces.

In an embodiment, the three-way valve further includes an A-sided end cap, and/or a B-sided end cap and/or an AB-sided-end cap. The A-sided end cap, the B-sided end cap and the AB-sided end cap are in each case attached to and project from the valve body. The A-sided end cap forms a fluidic connector of the A-port, and/or the B-sided end cap forms a fluidic connector of the B-port, and/or the AB-sided end cap forms a fluidic connector of the AB-port. In a particular embodiment, each of an A-sided end cap, a B-sided end cap and an AB-sided end cap as mentioned before are present.

The hollow inner volume of the end cap forms in each case a through-going central fluidic passage of the respective end cap. The end caps are attached to the valve body in a fluid tight and rigid manner, typically by screwing. For this purpose, corresponding inner threads may be for seen at the valve body and corresponding outer threads may be foreseen at an axial end section of each of the end caps. The end caps may generally be tubular. The A-sided end cap may be arranged coaxially with the A-sided valve seat, in particular its fluidic passage, regulation body contact surface and support surface. Similarly, the AB-sided end cap may be arranged coaxially with the AB-sided valve seat, in particular its fluidic passage, regulation body contact surface and support surface. The B-sided end cap may be arranged coaxially with the regulation body contact surface and support surface of the auxiliary valve seat.

In an embodiment, the B-sided end cap abuts the support surface of the A-sided valve seat and/or of the AB-sided valve seat. For such embodiment, a force is exerted onto the auxiliary valve seat in direction of the valve body and way from the regulation body by the B-sided end cap via the contact of the support surfaces of the A-sided valve seat and the AB-sided valve seat with the support surface of the auxiliary valve seat. Further, due to the oblique arrangement of the support surfaces as explained before, the valve seats are symmetrized.

In an embodiment, an A-sided O-ring is arranged at an interface between the A-sided valve seat and the A-sided end cap, and/or an AB-sided O-ring is arranged at an interface between the AB-sided valve seat and the AB-sided end cap. In a particular embodiment, the A-sided O-ring biases the A-sided valve seat against the regulation body and/or the AB-sided O-ring biases the AB-sided valve seat against the regulation body. For such embodiment, the A-sided O-ring and the AB-sided O-ring serve as both fluidic sealing and as spring element respectively biasing element for elastically biasing the respective valve seat against the regulation body. For elastically biasing the auxiliary valve seat against the regulation body, a further auxiliary O-ring may be foreseen at the interface between the auxiliary valve seat and the valve body. However, since the auxiliary valve seat is not flown through as discussed before, the sealing properties of an O-ring are not needed. Therefore, other types of biasing elements, for example one or more metallic spring elements, may be foreseen. For positioning and holding biasing elements, corresponding holding structures may be foreseen at the valve seat. For an A-sided O-ring and an AB-sided O-ring, the holding structure may for example be realized as a circumferential step of the A-sided valve seat and AB-sided valve seat, respectively. For holding an auxiliary O-ring, the auxiliary valve seat may have a circumferential groove or recess in which the auxiliary O-ring is placed.

A favorable method for the assembly of a three-way valve with end caps as explained before includes the following steps:
  a) arranging the auxiliary valve seat inside the valve body;
  b) arranging the regulation body inside the valve body;
  c) attaching the B-sided end cap to the valve body;
  d) arranging each of the A-sided valve seat and the AB-sided valve seat inside the valve body and attaching each of the A-sided end cap and the AB-sided end cap to the valve body.

Favorably, the steps are carried out in sequential order from (a) to (d) are carried out in sequential order. For arranging of the auxiliary valve seat and the regulation body, the auxiliary valve seat, if applicable with the mounted auxiliary O-ring, and the regulation body may be inserted into the valve body via the opening of the B-port. The A-sided valve seat may, if applicable with mounted A-sided O-ring, inserted into the valve body via the side of the A-port. Similarly, the AB-sided valve seat may, if applicable with mounted AB-sided O-ring, inserted into the valve body via the side of the AB-port.

DESCRIPTION OF THE EMBODIMENTS

Figure 1:
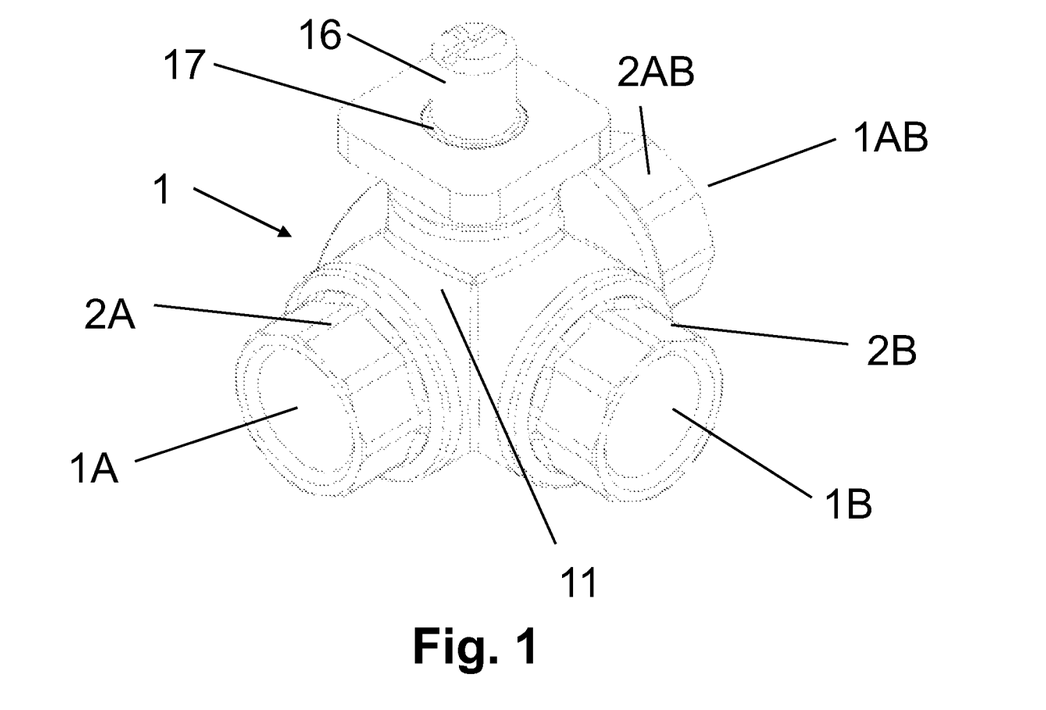
FIG. 1 shows an embodiment of a three-way valve in accordance with the present disclosure in a perspective view.

In the following, reference first made to FIG. 1, showing an embodiment of a three-way-valve 1 in accordance with the present disclosure in a perspective view. Three-way valve 1 has a valve body a with ports, namely A-port 1A, B-port 1B and AB-port 1AB. It can be seen that the A-port 1A and the AB-port 1AB are arranged at opposite sides of the valve body 11 in a coaxial manner respectively along a straight line, while the B-port 1B is arranged between the A-port 1A and the B-port 1B and traverse to those, resulting in a T-shaped overall configuration.

A tubular A-sided end cap 2A is threadably attached to the valve body 11 at the A-port 1A. Likewise, a tubular B-sided end cap 2B is threadably attached to the valve body 11 at the B-port 1B and a tubular AB-sided end cap 2AB is threadably attached to the valve body 11 at the AB-port 1AB as fluidic connectors.

A control shaft 16 extends out of the valve body 11 and is rotatable mounted exemplarily via a control shaft sleeve 17 as generally known in the art. In the inner of the valve body 11, an end of the control shaft 16 engages the regulation body (not visible in FIG. 1), thereby allowing a rotation of the regulation body by rotating the control shaft 16 about its longitudinal axis. In an operational configuration, the part of the control shaft 16 that projects out of the valve body 11 may be coupled to a manual operation handle, or to a valve actuator, for example a motor-driven valve actuator.

Figures 2A, 2B:
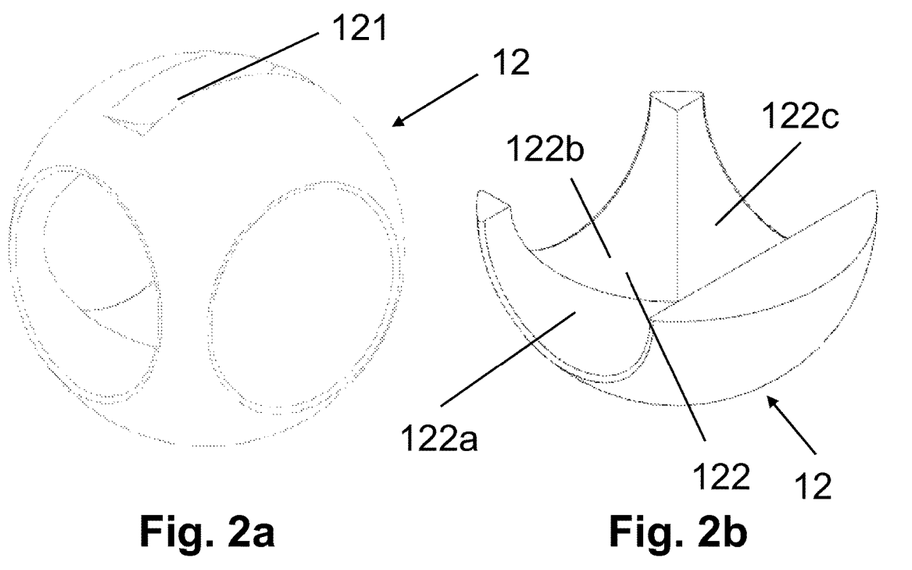
FIG. 2a shows the regulation body of the valve according to FIG. 1 in a perspective view.
FIG. 2b shows the regulation body of the valve according to FIG. 1 in a perspective sectional view.
Figure 2C:
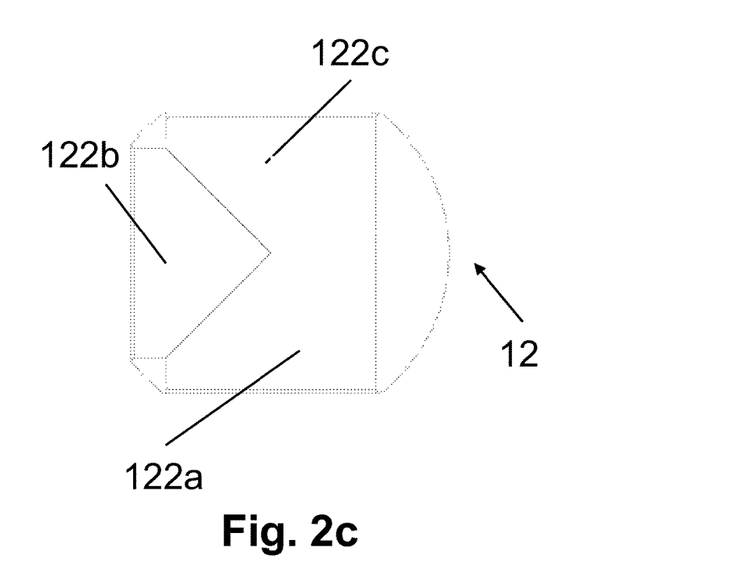
FIG. 2c shows the regulation body of the valve according to FIG. 1 in a sectional view.

In the following, reference is additionally made to FIG. 2a, FIG. 2b, and FIG. 2c, showing the regulation body 12 of the three-way-valve 1 in a perspective view (FIG. 2a), a perspective sectional view (FIG. 2b) and a sectional top view (FIG. 2c). It is noted that the regulation body 12 is mainly shown for the sake of illustration and complexity, but is known, as such, from the prior art. The overall shape of the regulation body 12 is spherical respectively ball-shaped. At one side (upper side in FIG. 2a), the regulation body 12 comprises an engagement slot 121 that engages, in an assembled state, the control shaft 16 as explained before.

The regulation body 12 has a fluidic lumen 122 with three intersecting branches 122a, 122b, 122c in 1 T-shaped arrangement, with the branches 122a, 122b, 122c extending to the surface respectively periphery, thereby perforating the regulation body 12.

Figure 3A:
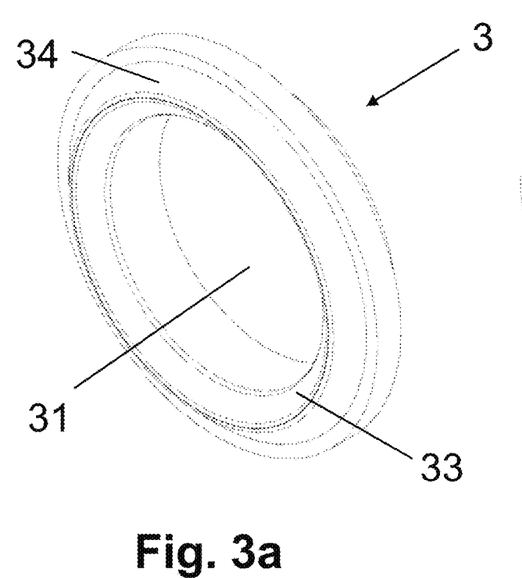
FIG. 3a shows a valve seat of the valve according to FIG. 1 in a perspective view.
Figure 3B:
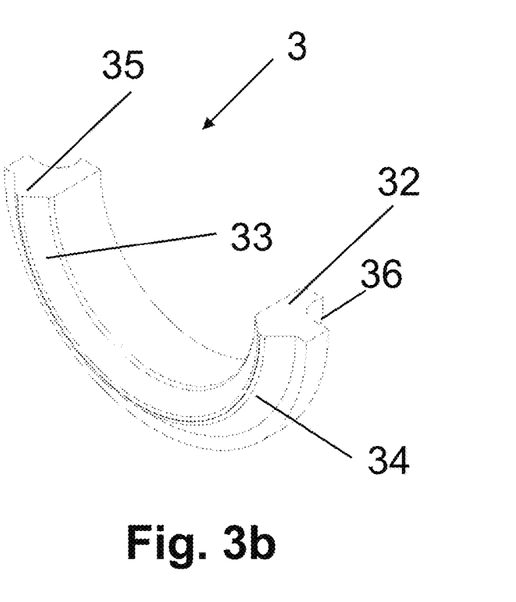
FIG. 3b shows a valve seat of the valve according to FIG. 1 in a perspective sectional view.
Figure 3C:
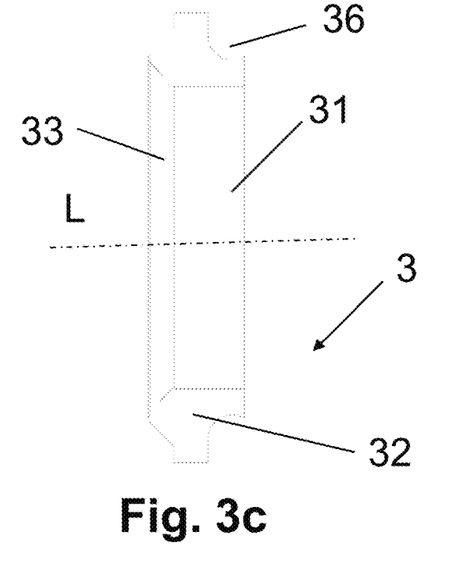
FIG. 3c shows a valve seat of the valve according to FIG. 1 in a sectional view.

In the following, reference is additionally made to FIG. 3a, FIG. 3b, and FIG. 3c, showing a valve seat 3 of three way-valve 1 in a perspective view (FIG. 3a), a perspective sectional view (FIG. 3b) and a sectional view (FIG. 3C).

In the shown design, the valve seat 3 may in particular serve as A-sided valve seat or AB-sided valve seat of a three-way-valve 1.

It can be seen that the valve seat 3 is ring-shaped and rotationally symmetric with respect to a longitudinal valve seat axis L. Further, the valve seat 3 comprises a through-going fluidic passage. Around the fluidic passage 31, a ring-shaped main body 32 is formed. In axial direction, a circumferential protrusion 35 extends from the main body 32. The protrusion 35 is delimited by a circumferential regulation body contact surface 33 and an in this example circumferential support surface 34 that are each oblique with opposite angles of 45 degrees with respect to the longitudinal valve seat axis L and accordingly form a right angle in a sectional view. At the side that is axially opposite to the protrusion 35, the main body 31 comprises a circumferential recess 36 which is foreseen to receive an O-ring as explained below.

Figure 4A:
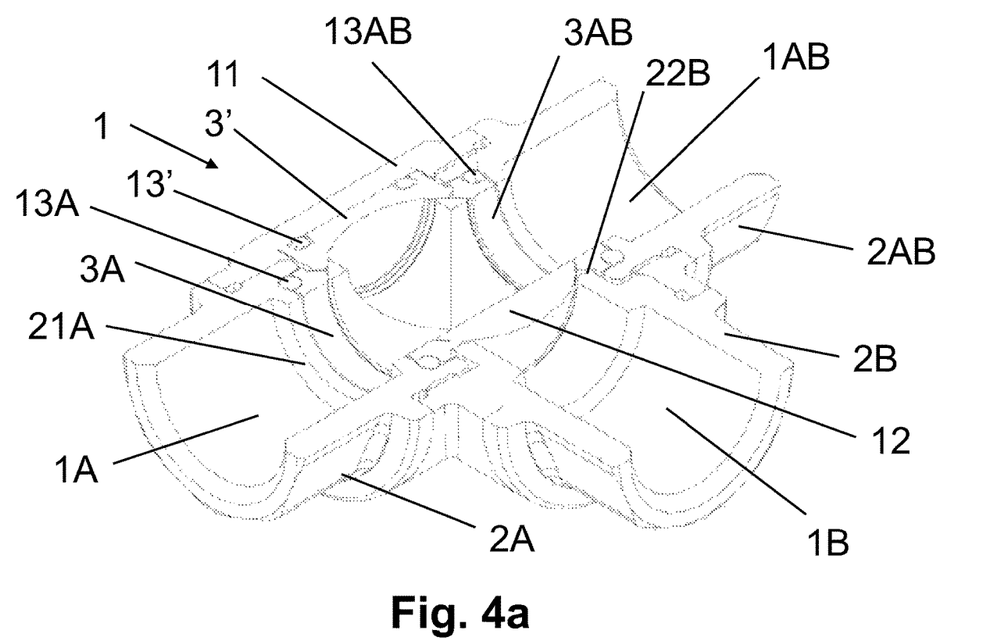
FIG. 4a shows the valve of FIG. 1 in a perspective sectional view in its A-position
Figure 4B:
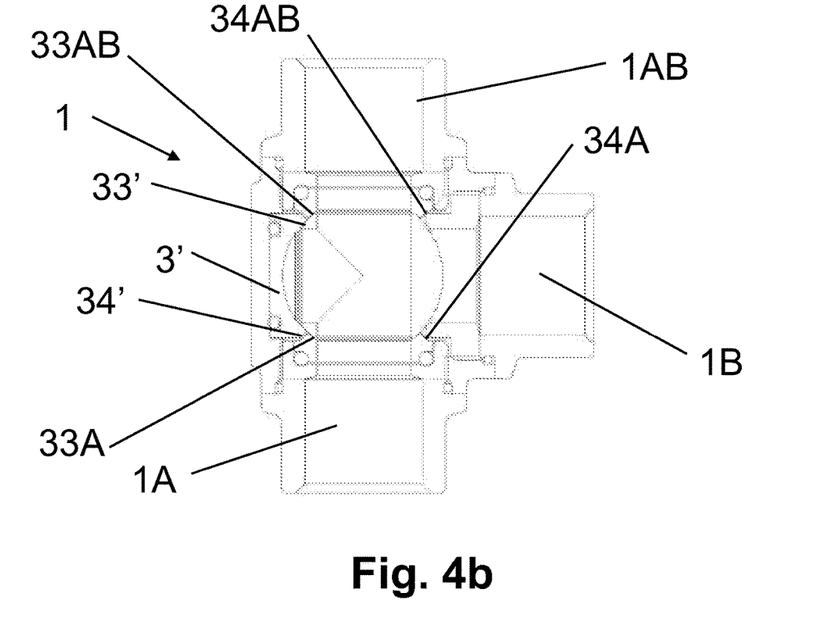
FIG. 4b shows the valve of FIG. 1 in a sectional view in its A-position.
Figure 5A:
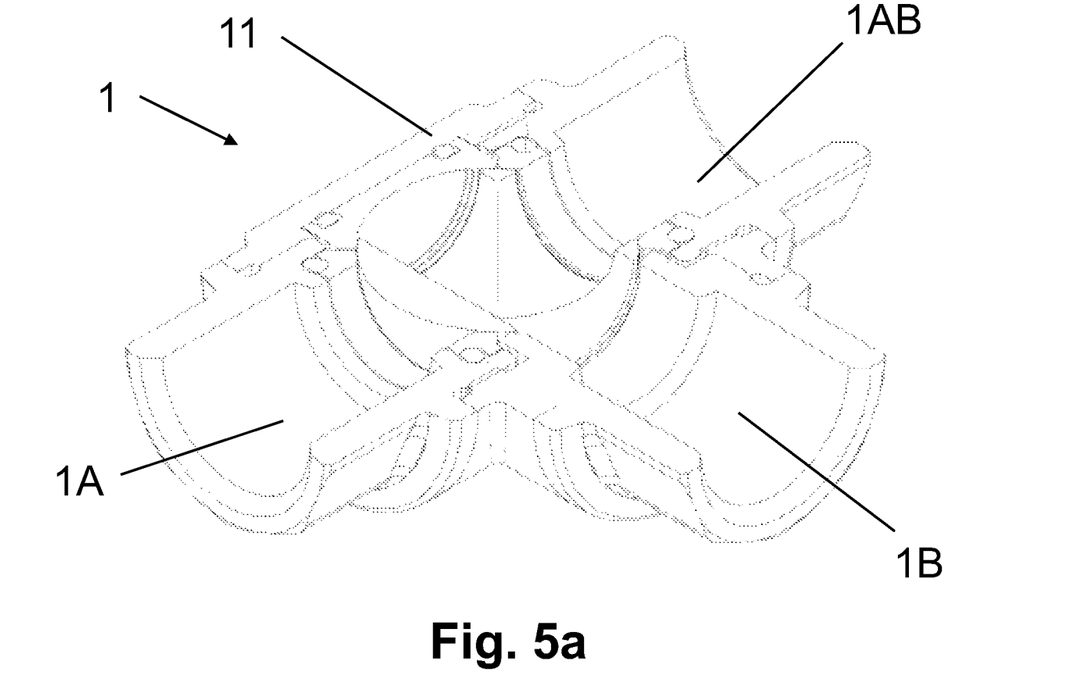
FIG. 5a shows the valve of FIG. 1 in a perspective sectional view in its B-position.
Figure 5B:
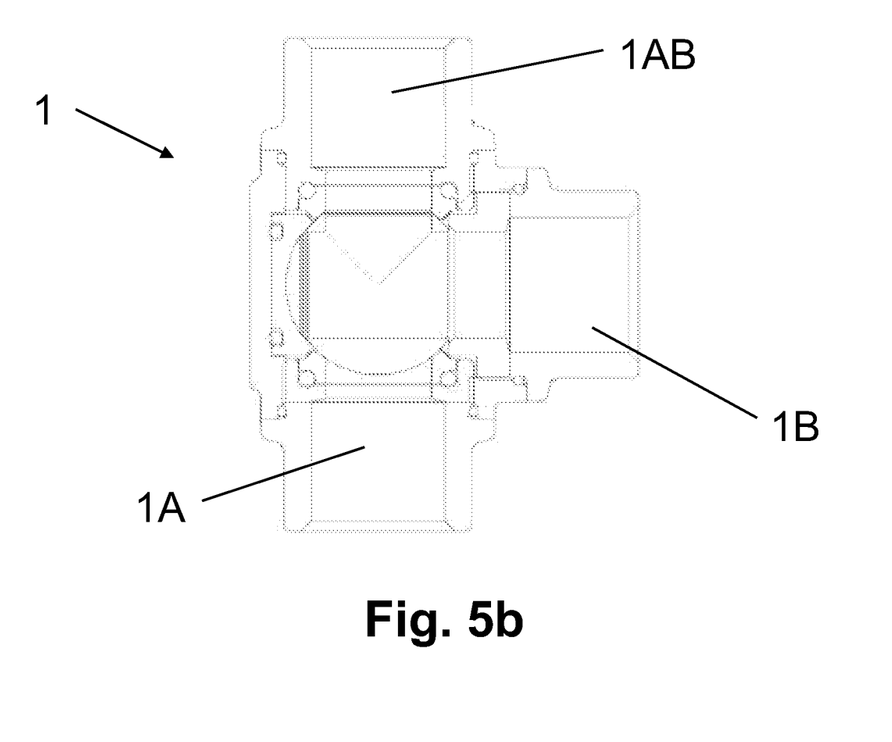
FIG. 5b shows the valve of FIG. 1 in a sectional view in its B-position.
Figure 6A:
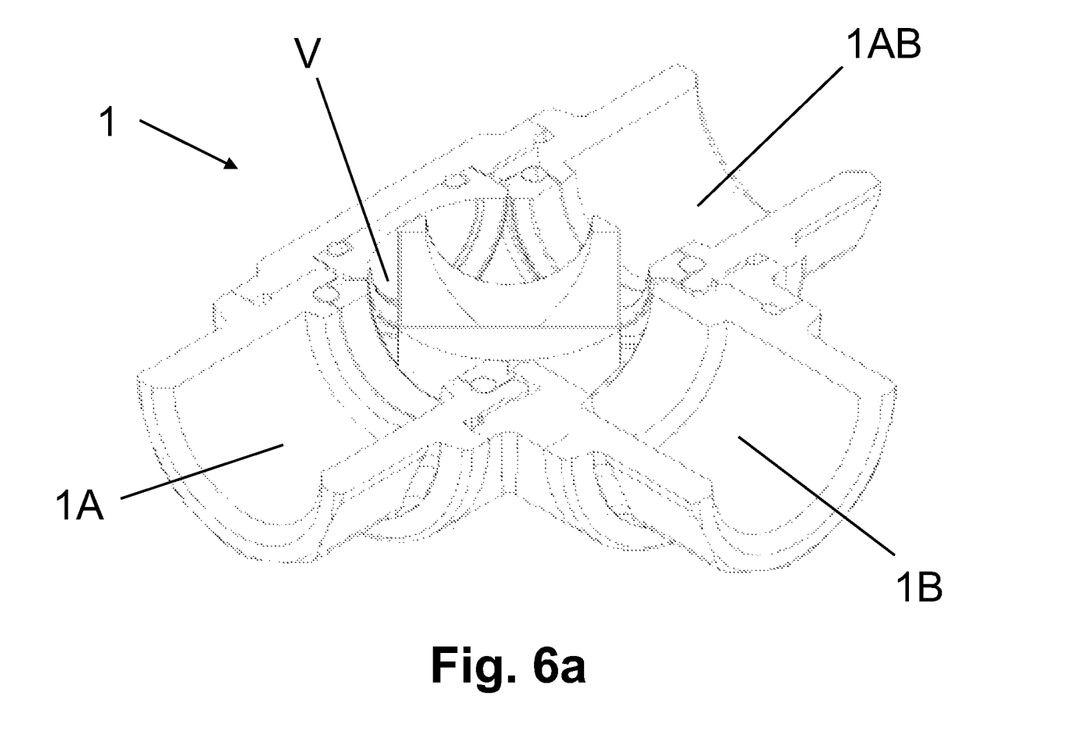
FIG. 6a shows the valve of FIG. 1 in a perspective sectional view in an intermediate position.
Figure 6B:
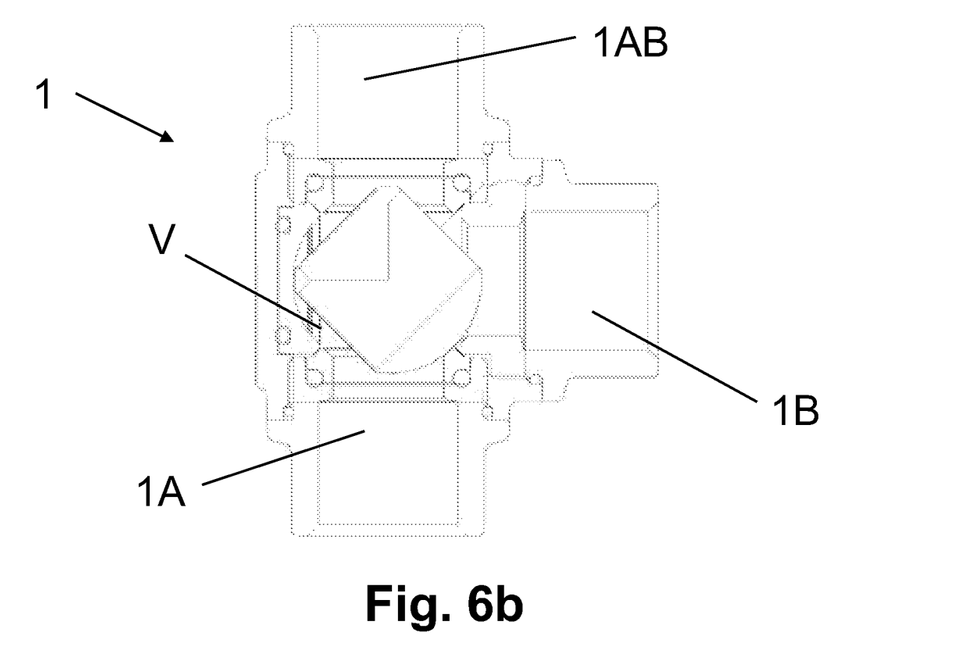
FIG. 6b shows the valve of FIG. 1 in a sectional view in an intermediate position.

In the following, reference is additionally made to FIG. 4a, FIG. 4b, FIG. 5a, FIG. 5b, FIG. 6a, and FIG. 6b. FIG. 4a and FIG. 4b show the three-way valve 1 in perspective sectional view (FIG. 4a) and a sectional view (FIG. 4b), with the three-way-valve 1 being in the A-position (0-degree position). In a similar manner, FIG. 5a and FIG. 5b show the three-way-valve 1 in the B-position (90-degree position), while FIG. 6a and FIG. 6b show an intermediate position (exemplarily 45-degree position).

The generally ball-shaped regulation body 12 is rotatably arranged within the valve body 11. From the side of the A-port 1A and the AB-port 1AB, the regulation body 12 is in each case circumferentially contacted by the regulation body contact surface 33A of the A-sided valve seat 3A and the regulation body contact surface 33AB of the AB-sided valve seat 3AB, respectively. The A-sided valve seat 3A and the AB-sided valve seat 3AB are designed as shown in FIG. 3. From the side opposite to the B-port 1B, the regulation body 12 is circumferentially contacted by the regulation body contact surface 33' of the auxiliary valve seat 3'. The auxiliary valve seat 3' may generally be designed in the same manner as the A-sided valve seat 3A and the AB-sided valve seat 3AB. In the shown example, however the auxiliary valve seat 3' does not comprise a fluidic passage but is shaped as the generally cylindrical disc which has at one side a spherical recess for the regulation body 12, with the spherical recess being surrounded by a protrusion that forms the regulation body contact surface 33' and the support surface 34', with the protrusion protruding in direction of the longitudinal valve seat axis L respectively towards the regulation body 12 in an assembled state.

In the shown embodiment, the A-sided valve seat 3A and the AB-sided valve seat 3AB are in each case forced respectively biased towards the regulation body 12 via s corresponding A-sided O-ring 13A, and AB-sided O-ring 13AB, which are arranged at the interface of the A-sided end cap 2A and the A-sided valve seat 3A respectively at the interface of the AB-sided end cap 2AB and the AB-sided valve seat 3AB. As abutment for the O-rings 13A, 13B, the a-sided end cap 2A and the AB-sided end cap 2AB each comprise an exemplarily circumferential rim (see rim 21A for A-sided and 2A) that extends in each case into the inner space of the respective end cap 2A, 2AB. By screwing the end caps 2A, 2AB into the valve body 11 respectively threaded attaching the end caps 2A, 2AB to the valve body 11 (threads not shown in detail), the A-sided O-ring 13A and the AB-sided O-ring 13AB are accordingly compressed. Thereby, the A-sided O-ring 13A and the AB-sided O-ring 13AB serve both as sealing element as well as biasing element for the A-sided valve seat 3A and AB-sided valve seat 3AB, respectively.

The auxiliary valve seat 3' is biased against the regulation body 12 via auxiliary O-ring 13', with an inner surface of the valve body 11 serving as abutment. For seating the auxiliary O-ring 13', the auxiliary valve seat 3' comprises a circumferential recess (not referenced), at the side facing the valve body 11 respectively pointing away from away from the regulation body 12.

Similar to the A-sided end cap 2A and the AB-sided end cap 2AB, the B-sided end cap 2B is screwed into respectively attached to the valve body 11. An exemplarily circumferential edge 22B of the B-sided end cap 2B contacts the support surfaces 34A, 34AB of the A-sided valve seat 3A and the AB-sided valve seat 3AB, thereby exerting a force in direction of the auxiliary valve seat 3'. Via the contact of the support surface 34A, 34AB with the support surface 34' of the auxiliary valve seat 3', an outwards directed force is accordingly exerted onto the auxiliary valve seat 3' and the auxiliary O-ring 13' is compressed. It is noted, however, that different designs may be used as well and in particular structurally separate distinct elements may be provided.

For the shown design, the regulation body 12 is maintained in position in a self-centering manner. Further, the A-sided valve seat 3A, the AB-sided valve seat 3AB and the auxiliary valve seat 3' are fixed and hold in position without requiring further attachment or fixation.

A particular advantage is given if the three-way valve 1 is in the A-position (FIG. 4a, FIG. 4b) and the B-port 1B is blocked by the regulation body 12. Any fluidic pressure at the side of the B-port 1B results in a force being exerted via the regulation body 12 onto the auxiliary valve seat 3', in turn resulting in the further compression of the auxiliary O-ring sealing 13' and accordingly in an increase of its biasing force. The biasing force increases with increasing fluidic pressure at the B-port. Thereby, a tight sealing of the B-port 1B is ensured and leakage to the A-port 1A or the AB-port 1AB is prevented even for a high fluidic pressure at the B-port 1B.

FIG. 6a, FIG. 6b) further illustrate a problem of prior art designs as explained in the following: In an intermediate position, voids exist between the valve seats and the regulation body (see exemplarily void referenced "V" at the A-port). Under fluid pressure at a port, the comparatively soft valve seat (that generally further softens with increasing temperature) at the respective port may partially be displaced into such void and be irreversibly trapped in the void, resulting in the regulation body being blocked. In a design according to the present disclosure as shown, this drawback is eliminated since the valve seats mutually support each other and do no not move.

Figure 7:
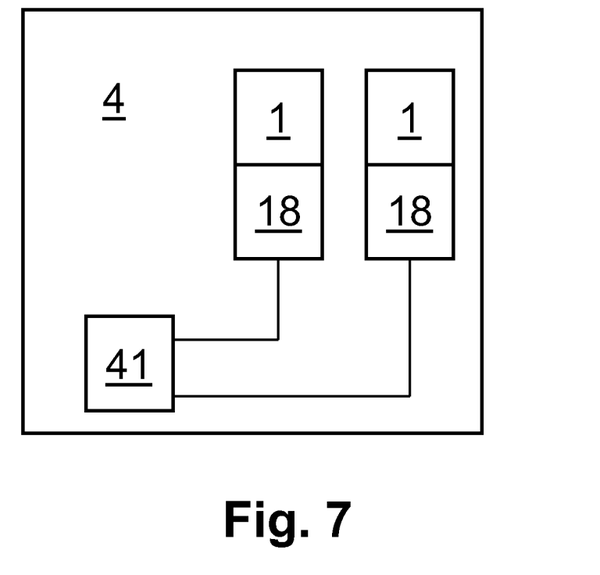
FIG. 7 shows an HVAC system in accordance with the present disclosure in a schematic functional view.

In the following, reference is additionally made to FIG. 7, schematically showing an HVAC system 4 in accordance with the present disclosure. The HVAC system 4 comprises a number of exemplary two three-way valves 1 in accordance with the present disclosure and as described above. The valve shaft 16 of each of the three-way valves 1 is coupled to a motorized valve actuator 18 which controls the rotational position of the control shaft 16 and accordingly of the regulation body 12 of the respective three-way valve 1. The motorized valve actuators 18 are operationally couple to and controlled by an HVAC control unit 41 as generally known in the art.

REFERENCE SIGNS 1 three-way-valve
1A A-port

1B B-port
1AB AB-port
11 valve body
12 regulation body
121 engagement slot
122 fluidic lumen
13A A-sided O-ring
13AB AB-sided O-ring
13' auxiliary O-ring
16 control shaft
17 control shaft sleeve
18 valve actuator
2A A-sided end cap
2B B-sided end cap
2AB AB-sided end cap
21A rim
22B edge
3 valve seat
3A A-sided valve sear
3B AB-sided valve seat
3' auxiliary valve seat
31 fluidic passage
32 main body
33 regulation body contact surface
33A regulation body contact surface (A-sided valve seat)
33AB regulation body contact surface (AB-sided valve seat)
33' regulation body contact surface (auxiliary-sided valve seat)
34 support surface
34A support surface (A-sided valve seat)
34AB support surface (AB-sided valve seat)
34' support surface (auxiliary-sided valve seat)
35 protrusion
4 HVAC system
41 HVAC control unit
L longitudinal valve seat axis
V void

The invention claimed is:

1. A three-way valve comprising:
an A-port, a B-port, and an AB-port;
a valve body;
a regulation body, the regulation body being rotatably arranged within the valve body, wherein an outer surface of the regulation body is delimited by a sphere,
wherein the AB-port is fluidically coupled with the A-port only, the B-port only, or both the A-port and the B-port in dependence of a rotational position of the regulation body,
an A-sided valve seat, an AB-sided valve seat and an auxiliary valve seat, wherein the A-sided valve seat, the AB-sided valve seat and the auxiliary valve seat are each arranged inside the valve body and contact the regulation body in a sealing manner,
wherein the A-sided valve seat is arranged at the A-port, the AB-sided valve seat is arranged at the AB-port, and the auxiliary valve seat is arranged opposite to the B-port, with the regulation body between the B-port and the auxiliary valve seat, and
wherein the A-sided valve seat, the AB-sided valve seat and the auxiliary valve seat each include a regulation body contact surface and a support surface, wherein the regulation body contact surface and the support surface are inclined with respect to each other, and
wherein the support surface of the A-sided valve seat and the support surface of the AB-sided valve seat each abut the support surface of the auxiliary valve seat.

2. The three-way-valve according to claim 1, wherein the A-sided valve seat, the AB-sided valve seat and the auxiliary valve seat are each elastically biased against the regulation body.

3. The three-way valve according to claim 1, wherein the A-sided valve seat, and/or the AB-sided valve seat and/or or the auxiliary valve seat are structurally distinct components.

4. The three-way valve according to claim 3, wherein the A-sided valve seat, the AB-sided valve seat, and the auxiliary valve seat are each fixed inside the valve body by way of force fit.

5. The three-way valve according to claim 1, further including an A-sided end cap, and/or a B-sided end cap and/or an AB-sided-end cap, wherein the A-sided end cap, the B-sided end cap and the AB-sided end cap are each attached to and project from the valve body, wherein the A-sided end cap forms a fluidic connector of the A-port, and/or the B-sided end cap forms a fluidic connector of the B-port, and/or the AB-sided end cap forms a fluidic connector of the AB-port.

6. The three-way valve according to claim 5, wherein the B-sided end cap abuts the support surface of the A-sided valve seat and/or the support surface of the AB-sided valve seat.

7. The three-way valve according to claim 5, wherein an A-sided O-ring is arranged at an interface between the A-sided valve seat and the A-sided end cap, and/or an AB-sided O-ring is arranged at an interface between the AB-sided valve seat and the AB-sided end cap.

8. The three-way valve according to claim 7, wherein the A-sided O-ring biases the A-sided valve seat against the regulation body and/or the AB-sided O-ring biases the AB-sided valve seat against the regulation body.

9. An HVAC system including at least one of the three-way valve according to claim 1.

10. A method for assembling the three-way valve of claim 5, the method comprising:
placing the auxiliary valve seat inside the valve body;
placing the regulation body inside the valve body;
attaching the B-sided end cap to the valve body; and
placing each of the A-sided valve seat and the AB-sided valve seat inside the valve body and attaching each of the A-sided end cap and the AB-sided end cap to the valve body.

11. The method of claim 10, further comprising using the three-way-valve for controlling a flow of a heat-transport fluid in an HVAC-system.

* * * * *